US012394818B2

(12) United States Patent
S et al.

(10) Patent No.: US 12,394,818 B2
(45) Date of Patent: Aug. 19, 2025

(54) PROCESS FOR PREPARING A COMPOSITE ANODE FOR LITHIUM ION CELL

(71) Applicant: INDIAN SPACE RESEARCH ORGANISATION, Bangalore (IN)

(72) Inventors: Aravamuthan S, Thiruvananthapuram (IN); Td Mercy, Thiruvananthapuram (IN); John Bibin, Thiruvananthapuram (IN)

( * ) Notice: Subject to any disclaimer, the term of this patent is extended or adjusted under 35 U.S.C. 154(b) by 572 days.

(21) Appl. No.: 17/636,363

(22) PCT Filed: Jul. 7, 2020

(86) PCT No.: PCT/IN2020/050591
§ 371 (c)(1),
(2) Date: Feb. 18, 2022

(87) PCT Pub. No.: WO2021/033195
PCT Pub. Date: Feb. 25, 2021

(65) Prior Publication Data
US 2022/0294005 A1   Sep. 15, 2022

(30) Foreign Application Priority Data

Aug. 20, 2019 (IN) .............................. 201941033431

(51) Int. Cl.
| | |
|---|---|
| *H01M 10/0525* | (2010.01) |
| *H01M 4/04* | (2006.01) |
| *H01M 4/36* | (2006.01) |
| *H01M 4/583* | (2010.01) |
| *H01M 4/62* | (2006.01) |
| *H01M 4/66* | (2006.01) |
| *H01M 4/02* | (2006.01) |

(52) U.S. Cl.
CPC ..... *H01M 10/0525* (2013.01); *H01M 4/0404* (2013.01); *H01M 4/0435* (2013.01); *H01M 4/364* (2013.01); *H01M 4/583* (2013.01); *H01M 4/623* (2013.01); *H01M 4/661* (2013.01); *H01M 2004/027* (2013.01)

(58) Field of Classification Search
CPC ........... H01M 10/0525; H01M 4/0404; H01M 4/0435; H01M 4/364; H01M 4/583; H01M 4/623; H01M 4/661; H01M 2004/027
See application file for complete search history.

(56) References Cited

U.S. PATENT DOCUMENTS

| | | | | |
|---|---|---|---|---|
| 9,397,338 | B2* | 7/2016 | Park .................... | H01M 4/13 |
| 2002/0007552 | A1* | 1/2002 | Singleton .......... | H01M 10/0436 |
| | | | | 29/730 |
| 2012/0077035 | A1* | 3/2012 | Spahr .................. | C09D 5/24 |
| | | | | 252/502 |
| 2014/0004418 | A1* | 1/2014 | Kobayashi .......... | H01M 4/1395 |
| | | | | 429/211 |
| 2014/0170482 | A1* | 6/2014 | Park .................... | H01M 4/13 |
| | | | | 156/60 |
| 2016/0118685 | A1* | 4/2016 | Zhang ................. | H01M 10/056 |
| | | | | 429/231.95 |
| 2017/0288210 | A1* | 10/2017 | Woehrle ............... | H01M 4/364 |

FOREIGN PATENT DOCUMENTS

| | | | |
|---|---|---|---|
| JP | 08195201 A | * | 7/1996 |
| JP | 2003068301 A | * | 3/2003 |

OTHER PUBLICATIONS

JP-2003068301 MT (Year: 2003).*
Notice of Reasons for Refusal For JP2022511046 from 03_7_2024 (Year: 2024).*
The decision of JPO to grant a Patent for Application JP 2022511046 (Year: 2024).*

* cited by examiner

*Primary Examiner* — Alexander Usyatinsky
(74) *Attorney, Agent, or Firm* — JMB DAVIS BEN-DAVID

(57) ABSTRACT

The present application provides a process for preparing a composite anode for a lithium ion cell comprising the steps of: (i) forming an anode slurry in a planetary mixing machine by mixing active materials, a binder and a solvent; (ii) coating the slurry over a copper foil substrate in a coating machine at a speed of 0.3-1.0 m/min; and (iii) calendering of the anode in a calendering machine at a temperature of 50-150° C. The lithium ion cell with the anode disclosed in this invention and a cathode exhibited a capacity retention of >80% at 100% depth-of-discharge at C/2-1C charge-discharge rate when tested for 2000 cycles.

16 Claims, No Drawings

PROCESS FOR PREPARING A COMPOSITE ANODE FOR LITHIUM ION CELL

CROSS REFERENCE TO RELATED APPLICATIONS

This is the U.S. National Stage of International Patent Application No. PCT/IN2020/050591, filed Jul. 7, 2020, which claims priority to Indian Patent Application No. 201941033431, filed Aug. 20, 2019.

FIELD OF INVENTION

The present invention pertains to a process for preparing a composite anode. Specifically, the present invention pertains to a process for preparation a composite anode for lithium ion cells, having excellent peel strength, specific capacity and capacity retention.

BACKGROUND OF INVENTION

In the recent years lithium ion cells have gained considerable attention as a power source for various applications viz. mobile phones, cameras, laptops and also for high-tech applications like military, aircraft, space and electric vehicles.

Generally the major components of a lithium ion cell include cathode, anode, electrolyte and a separator. The performance of a lithium ion cell is influenced by the properties of the electrodes used which in turn depend on type of materials employed, electrode composition and electrode processing technique.

Lithiated transition metal oxides/phosphates have been employed as cathode, graphite/carbon as anode and a lithium salt dissolved in organic salts as electrolyte for lithium ion cells. The anode material used in lithium ion cells should exhibit high specific capacity, good cycling performance, rate capability and safety features. In some cases as in satellite applications, it is required that the material should exhibit a sloping discharge curve instead of a flat one, so that it is possible to predict the state-of-charge at any point of time by checking the voltage of cell.

The electronic devices for modern applications require high energy lithium ion cells which require the use of high capacity anode materials.

Substantial amount of research has been carried out to develop anode materials, electrode compositions, and the process adopted thereof, for use in lithium ion cells with specific properties.

US 2008/0206641 A1 deals with composite anode which consists of an active material like Si, graphite and a binder.

U.S. Pat. No. 8,354,189 B2 deals with negative electrode consisting of active materials like tin, tin alloy, silicon, silicon alloy etc.

US 2013/0216910 A1 and US 2014/0234719 A1 deal with lithium ion cell which contains Si or Sn based anode.

US 2009/0305131 A1 deals with metal alloy/intermetallic particles as anode active material.

JP 2004213927A discloses negative electrode for lithium ion cells in which the active material consists of a mixture of carbonaceous material, graphite, and nano-metallic particles selected from a group of Ag, Zn, Al, Ga, In, Si, Ge, Sn and Pb.

The main difficulty associated in the prior art, high capacity anode materials is that the high volumetric change during cycling which limits their cycle life which is an important parameter for critical applications specifically in satellites.

As far as the cycle life is concerned, especially for satellite applications, the most appropriate active material is graphite owing to its excellent electrochemical features. In order to improve the performance of graphite anode, composites of graphite with various carbonaceous materials are attempted.

U.S. Pat. No. 5,908,715 discloses graphite based composite electrode containing graphite and a non-graphitizable carbon. The particles of the material include a graphite core that has been provided with a surface layer including a non-graphitizable carbonaceous material.

EP 627,777 discloses a lithium ion battery in which the carbon material for the anode contains both graphite and a non-graphitic carbon material.

Graphite has higher true density than the non-graphitizable carbon material, and therefore exhibits a high electrode packing property when used for the anode. The lower true density of non-graphitizable carbon and the lower intercalation capacity of lithium ions into non-graphitic carbon are the major disadvantages of non-graphitic carbon anodes.

U.S. Pat. No. 5,958,622 discloses an anode composition consisting of a mixture of graphite and coke. However since coke is having lower capacity compared to graphite, the mixture gives only lower capacity.

In the prior art for composite anode, graphite is used in combination with non-graphitizable carbon, low crystalline carbon, graphitized microbead carbon particle or coke. The disadvantage with these materials is their lower capacity compared to graphite. Therefore, the combination will give only lower capacity. Moreover, graphite has higher true density than these materials and therefore exhibits a high electrode packing property when used for the anode.

Therefore, it would be advantageous to provide an effective composite anode which has desirable anode properties like excellent specific capacity and cycle life, loading level, thickness, moisture content and peel strength and maximum packing efficiency so that particle-to-particle conductivity and packing density are improved to enhance the overall specific capacity and rate capability of the cell.

Object of the Invention

The object of the present invention is to provide a process for preparing a composite anode for a lithium ion cell comprising the steps of: (i) forming an anode slurry in a planetary mixing machine by mixing active materials, a binder and a solvent; (ii) coating the slurry over a copper foil substrate in a coating machine at a speed of 0.3-1.0 m/min; and (iii) calendering of the anode in a calendering machine at a temperature of 50-130° C. for a lithium ion cell having excellent anode properties for various applications including electric vehicles, launch vehicles, satellites, submarines, aircrafts etc.

DETAILED DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification are to be understood as being modified in all instances by the term "about". It is noted that, unless otherwise stated, all percentages given in this specification and appended claims refer to percentages by weight of the total composition.

Thus, before describing the present invention in detail, it is to be understood that this invention is not limited to particularly exemplified systems or method parameters that may of course, vary. It is also to be understood that the terminology used herein is for the purpose of describing particular embodiments of the invention only, and is not intended to limit the scope of the invention in any manner.

The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

It must be noted that, as used in this specification and the appended claims, the singular forms "a," "an" and "the" include plural referents unless the content clearly dictates otherwise. Thus, for example, reference to a "polymer" may include two or more such polymers.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the terms "comprising" "including," "having," "containing," "involving," and the like are to be understood to be open-ended, i.e., to mean including but not limited to.

In one aspect, the present application provides a process for preparing a composite anode for a lithium ion cell comprising the steps of:

i. forming an anode slurry in a planetary mixing machine by mixing active materials, a binder and a solvent;

ii. coating the slurry over a copper foil substrate in a coating machine at a speed of 0.3-1.0 m/min; and iii. calendering of the anode in a calendering machine at a temperature of 50-130° C.

In an embodiment the anode slurry is prepared in a planetary mixing machine by mixing the active material, and binder in the presence of a solvent. The anode slurry in accordance with the present invention is performed by dry mixing the active materials, followed by the addition of binder and then the solvent in the planetary mixing machine.

In an embodiment the active material is selected from spherical graphite, flaky graphite, non-graphitizable carbon, mesocarbon microbeads and the like. In a preferred embodiment the active materials are spherical graphite and flaky graphite.

In an embodiment the binder is selected from polyvinylidene fluoride (PVDF), poly(vinylidene fluoride-co-hexafluoropropylene), etc. In a specific embodiment the binder is polyvinylidene fluoride. The binder provides good adhesion between the constituent materials in the electrode as well as binding the constituent materials on substrate. The binder should be compatible with the materials used in the cell and also should exhibit electrochemical stability in the operating voltage window of the cell.

In an embodiment the solvent is selected from 1-methyl-2-pyrrolidinone (NMP), dimethyl acetamide (DMAC), dimethyl formamide (DMF), etc. In a preferred embodiment the solvent is 1-methyl-2-pyrrolidinone. The role of solvent is to dissolve the binder to provide better mixing of the constituents in the slurry.

The process involves drying the ingredients prior to mixing in the planetary mixing machine.

The moisture content in electrodes is an important factor which affects the efficiency, reversible capacity and cycle life of lithium ion cells. Therefore, the ingredients used for anode slurry preparation are dried prior to mixing to remove moisture.

The powder materials except PVDF are dried at 150-230° C. for 20-36 hours under vacuum. PVDF is dried at a lower temperature. PVDF is dried at 50-80° C. for a period of 2-7 hours under vacuum of 600-700 mm Hg.

The formation of anode slurry by mixing the active material and binder in the presence of a solvent is carried out in the planetary mixing machine. The ingredients of the anode are fed into the planetary mixing machine through an inlet. The planetary mixing machine comprises planetary blades and high speed dispersers. Mixing of the ingredients in the planetary mixing machine ensures uniform mixing of ingredients and avoids pulverization of the active material, which thereby aids in achieving anode with excellent performance attributes.

In an embodiment the planetary blade speed is in the range of 40 to 160 rpm and the disperser speed is in the range of 450 to 600 rpm.

The sequence adopted for mixing of the ingredients is quite crucial in deciding the electrochemical properties of the anode. In accordance with the present disclosure the anode slurry formation process is carried out in a planetary mixing machine with high speed dispersers. The first step in anode slurry preparation involves dry mixing of the powder materials at a lower speed followed by the addition of required quantity of PVDF solution. Then NMP is added at different intervals to reduce the viscosity of the anode slurry to the desired level while continuing mixing.

The slurry processing is carried out in a humidity controlled environment with a relative humidity ranging from 2 to 15%.

In a specific embodiment the viscosity of the slurry is in the range of 2000 to 15000 cps at a speed of 100 rpm (measured in a Brookfield Viscometer RVDV-1 Prime using spindle S-06). The viscosity of slurry plays a critical role in deciding the properties of the electrodes. Viscosity decides the controllability in loading level, peel strength and thereby the performance of the electrode during cycling.

In an embodiment the active material is present in the amount ranging from 45 to 55 wt % based on the total weight of the anode slurry.

In an embodiment the binder is present in the amount ranging from 1 to 10 wt % based on the total weight of the anode slurry.

In an embodiment the solvent is present in the amount ranging from 45 to 55 wt % based on the total weight of the anode slurry.

The composition of the electrode is very important in deciding its electrochemical properties. The concentration of active material in electrodes determines the capacity delivered by the electrode. Binder provides adhesion between the constituent materials in the electrode as well as binding the constituent materials on the substrate. High active material concentration results in high capacity. However, the optimum concentration of conducting diluent and binder is required for good cycle life and rate capability of the cell.

In a further step the process involves coating of the anode slurry over a copper foil substrate in a coating machine. In an embodiment the copper foil substrate has a thickness in the range of 8 to 15 µm.

The coating of the anode slurry over the copper foil substrate is carried out in the coating machine. The anode slurry formed in the planetary mixing machine is transferred to a coating machine. The coating machine works on reverse comma principle. The gap between the reverse comma blade and applicator is first adjusted to get the desired loading level of the active material on the copper foil substrate. In an embodiment the gap set value is in the range of 100 to 300 µm. The optimum coating speed and drying temperature are required for ensuring complete removal of solvent and to get electrodes without defects like cracking, peeling of active material etc.

The coating of the anode slurry in accordance with the present disclosure comprises of: a) feeding the slurry into a slurry dam to initiate coating, b) transferring the slurry into the foil based on the thickness between applicator and reverse comma blade, c) passing the foil coated with the slurry through two heating zones, d) after completing the coating on one side of the foil, it is reversed to make coating on other side of the foil.

The coating machine comprises a plurality of heating zones. The foil coated with the slurry passes through the heating zones. After completing the coating on one side of the foil, it is reversed to make coating on other side of the foil. The coating speed and temperature values are arrived at based on the drying of the anode after passing through the two heating zones.

In an embodiment, the anode is dried in heating zone at a temperature in the range of 50 to 150° C. in the coating machine.

The dried anode is then finally wound in roll form. In an embodiment the coating speed is in the range of 0.3 to 0.8 m/min.

The coating environment plays a crucial role in deciding the properties of the electrode. The coating process is carried out at a relative humidity in the range of 2 to 15%. The anode after coating is dried at a temperature in the range of 60 to 100° C. under vacuum. In an embodiment the thickness of the anode after coating is in the range of 150 to 250 µm. In an embodiment the anode is dried at a vacuum in the range of 600 to 700 mmHg for a period of 15 to 25 hours.

In a next step the process involves calendering of the anode in the calendering machine. In an embodiment the calendering of the anode is performed at a speed of 0.5 to 3 m/min. In an embodiment the calendering of the anode is performed in the calendering machine at a temperature in the range of 50 to 150° C.

The calendering machine comprises a pre-heat zone and two heated rolls for pressing the anode. The anode thus formed in accordance with the present disclosure in the roll form is passed through the preheat zone and pressed in calendering machine rollers to a thickness of 100 to 200 µm at a speed of 0.5 to 3 m/min.

In an embodiment the temperature in the pre-heat zone is in the range of 80 to 150° C. In an embodiment the calender roll temperature is in the range of 50 to 100° C.

The anode thus formed in accordance with the present disclosure is assembled against a cathode to form a lithium ion cell. The lithium ion cell thus formed has exhibited excellent cell characteristics. The lithium ion cell with the anode in accordance with the present invention and a $LiNi_{0.8}Co_{0.15}Al_{0.05}O_2$ based cathode exhibited capacity retention of greater than 80% at 100% depth-of-discharge at C/2-1C charge-discharge rate when tested for 2000 cycles.

In an embodiment the peel strength of the anode is in the range of 10 to 40 gf/cm. In a preferred embodiment the peel strength is in the range of 10 to 20 gf/cm In an embodiment the specific capacity of the anode is in the range of 345 to 365 mAh/g. In a preferred embodiment the specific capacity is in the range of 350 to 355 mAh/g.

In an embodiment the capacity retention of the cell with the anode in accordance with the present invention is greater than 80% in 2000 cycles when tested at C/2 charge rate and 1C discharge rate versus $LiNi_{0.8}Co_{0.15}Al_{0.05}O_2$ as cathode.

The composite anode for a lithium ion cell in accordance with the present disclosure comprises (i) graphite (spherical): 60-80%; (ii) graphite (flaky): 10-30%, PVDF: 2-10%, excluding copper foil. In some embodiments the active material in composite anode may also be mesocarbon microbeads, non-graphitic carbon, Si, etc.

The following examples are provided to better illustrate the claimed invention and are not to be interpreted in any way as limiting the scope of the invention. All specific materials, and methods described below, fall within the scope of the invention. These specific compositions, materials, and methods are not intended to limit the invention, but merely to illustrate specific embodiments falling within the scope of the invention. One skilled in the art may develop equivalent materials, and methods without the exercise of inventive capacity and without departing from the scope of the invention. It is the intention of the inventors that such variations are included within the scope of the invention.

EXAMPLES

The preparation of the composite anode for a lithium ion cell with excellent cell characteristics is described in the following examples.

Example 1

The electrode processing for mixed graphite based composite anode is described below:

The composite anode consists of a mixture of spherical and flaky graphite as active material and polyvinylidene fluoride (PVDF) as binder. The electrode composition is graphite (spherical): 70-75%; (ii) graphite (flaky): 20-25%, PVDF: 4-6%. The spherical graphite has a particle size of 15-30 µm ($D_{50}$) and flaky graphite has a particle size of 15-35 µm ($D_{50}$). 1-methyl-2-pyrolidinone (NMP) is used as solvent for the processing of the electrode slurry. The graphite powders and PVDF are dried under vacuum prior to mixing. The electrode processing involves slurry preparation, electrode coating and calendering.

The slurry preparation is carried out in a planetary mixing machine with high speed dispersers. The slurry preparation involves dry mixing of spherical and flaky graphite powders in the mixing machine at a planetary blade speed of 50-70 rpm and disperser speed of 450-500 rpm followed by addition of polyvinylidene fluoride solution and addition of NMP at different intervals while continuing mixing at a planetary blade speed of 50-150 rpm. The volume of NMP is adjusted to get a slurry solid content of 50-54%.

The electrode coating is carried out in a coating machine which works on reverse comma principle. Copper foil with a thickness of 10-12 µm was used for coating. The gap between the reverse comma blade and applicator is adjusted to get a gap of 150-200 μm. The slurry is loaded to the slurry dam and coating is carried out. The coating is carried out at a speed of 0.3-0.7 m/min. The temperature of the heating zone is kept at 80-120° C. The electrode after drying is collected in roll form from the machine. The electrode is then dried at 70° C. for 15-20 h under vacuum. The thickness of the electrode after double side coating is 200-260 μm.

The calendering of the electrode is carried out in a calendering machine with pre-heat zone and calender rolls. The pre-heating temperature is 100-120° C. and calendering roll temperature is 50-80° C. The electrode in the roll form is passed through pre-heat rolls and calender rolls at a speed of 1-2 m/min to get a final electrode thickness of 140-170 μm.

Example 2

The electrode processing for mixed graphite based composite anode is described below:

The composite anode consists of a mixture of spherical and flaky graphite as active material and polyvinylidene fluoride (PVDF) as binder. The electrode composition is graphite (spherical): 71-73%; (ii) graphite (flaky): 21-24%, PVDF: 5-7%. 1-methyl-2-pyrolidinone (NMP) is used as solvent for the processing of the electrode slurry. The graphite powders and PVDF are dried under vacuum prior to mixing. The electrode processing involves slurry preparation, electrode coating and calendering.

The slurry preparation is carried out in a planetary mixing machine with high speed dispersers. PVDF solution is prepared in planetary mixing machine by adding 1-methyl-2-pyrrolidinone at different time intervals to PVDF taken in planetary mixing machine while continuing mixing. The slurry preparation involves dry mixing of spherical and flaky graphite powders in the mixing machine at a planetary blade speed of 50-60 rpm and disperser speed of 500-550 rpm followed by addition of the prepared polyvinylidene fluoride solution and addition of NMP at different intervals while continuing mixing at a planetary blade speed of 50-150 rpm. The volume of NMP is adjusted to get a slurry solid content of 48-52%.

The electrode coating is carried out in a coating machine which works on reverse comma principle. Copper foil with a thickness of 10-12 μm was used for coating. The gap between the reverse comma blade and applicator is adjusted to get a gap of 100-150 μm. The slurry is loaded to the slurry dam and coating is carried out. The coating is carried out at a speed of 0.5-0.9 m/min. The temperature of the heating zone is kept at 80-120° C. The electrode after drying is collected in roll form from the machine. The electrode is then dried at 70° C. for 15-20 h under vacuum. The thickness of the electrode after double side coating is 120-160 μm.

The calendering of the electrode is carried out in a calendering machine with pre-heat zone and calender rolls. The pre-heating temperature is 100-120° C. and calendering roll temperature is 50-80° C. The electrode in the roll form is passed through pre-heat rolls and calender rolls at a speed of 1-2 m/min to get a final electrode thickness of 100-130 μm.

TABLE 1

Performance attributes of the composite anode

| S No | Anode property | Value |
|---|---|---|
| 1 | Peel strength | 10-40 g/cm |
| 2 | Loading level | 6-11 mg/cm$^2$ |
| 3 | Thickness | 100-200 μm |
| 4 | Moisture content | <300 ppm |
| 5 | Specific capacity | 345-365 mAh/g @ C/10 rate |

TABLE 2

Performance attributes of the lithium ion cell comprising the composite anode

| S No | Lithium cell property | Value |
|---|---|---|
| 1 | Cycle life | 2000 cycles @ C/2 charge and 1 C discharge cycles, @ 100% depth-of-discharge |
| 2 | Capacity retention | >80% |
| 3 | Coulombic Efficiency | >99% |

The invention claimed is:

1. A process for preparing a composite anode for a lithium ion cell comprising the steps of:
   i. forming an anode slurry in a planetary mixing machine by mixing active materials, a binder and a solvent;
   ii. coating the slurry over a copper foil substrate in a coating machine at a speed of 0.3-1.0 m/min; and
   iii. calendering of the anode in a calendering machine at a temperature of 50-150° C.,
   wherein the active material is a mixture of spherical graphite and flake graphite, and the binder comprises: Polyvinylidene fluoride, the organic solvent is 1-methyl-2-pyrrolidinone, the amount of the binder is in the range of 1 to 15 wt % based on the total amount of the anode slurry, and the amount of the organic solvent is in the range of 45 to 55 wt % based on the total amount of the anode slurry; comprises forming the anode slurry of viscosity in the 2000-15000 cps range by dry mixing the active materials, followed by addition of binder solutions and then addition of the solvents at different time intervals.

2. The process as claimed in claim 1, comprises drying the ingredients prior to mixing in the planetary mixing machine.

3. The process as claimed in claim 1, wherein step (i) is performed by dry mixing the active materials, followed by the addition of binder solution and then the solvent.

4. The process as claimed in claim 1, wherein the active material is a mixture of spherical graphite and flaky graphite.

5. The process as claimed in claim 1, wherein the binder is selected from polyvinylidene fluoride, poly (vinylidene fluoride-co-hexafluoropropylene).

6. The process as claimed in claim 1, wherein the solvent is selected from 1-methyl-2-pyrrolidinone, dimethyl acetamide (DM AC), dimethyl formamide (DMF).

7. The process as claimed in claim 1, wherein the amount of spherical graphite is in the range of 30 to 40 wt % based on the total weight of the anode slurry.

8. The process as claimed in claim 1, wherein the amount of flaky graphite is in the range of 5 to 15 wt % based on the total weight of the anode slurry.

9. The process as claimed in claim 1, wherein the amount of binder is in the range of 1 to 15 wt % based on the total weight of the anode slurry.

10. The process as claimed in claim 1, wherein the amount of solvent is in the range of 45 to 55 wt % based on the total weight of the anode slurry.

11. The process as claimed in claim 1, wherein the copper foil substrate has a thickness in the range of 8 to 15 pm.

12. The process as claimed in claim 1, wherein the thickness of the anode after coating is in the range of 200 to 300 pm.

13. The process as claimed in claim 1, wherein the final thickness of the anode after calendering is in the range of 100 to 200 pm.

14. The process as claimed in claim 1, wherein the relative humidity of the process environment in which the electrode processing is carried out is in the range of 2 to 15%.

15. The process as claimed in claim 1, comprises drying the anode in a drying zone after coating at a temperature in the range of 50 to 150° C.

16. The process as claimed in claim 1, wherein the calendering of the anode is performed at a speed of 0.5 to 3 m/min, and at a temperature in the range of 50-150° C.

\* \* \* \* \*